(12) United States Patent
Nara

(10) Patent No.: US 6,400,941 B1
(45) Date of Patent: Jun. 4, 2002

(54) MOBILE INFORMATION DEVICE CAPABLE OF OBTAINING USER INFORMATION RELATING TO LOCAL AREA

(75) Inventor: Kazuya Nara, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/060,576

(22) Filed: Apr. 15, 1998

(30) Foreign Application Priority Data

Apr. 21, 1997 (JP) .............................................. 9-103182

(51) Int. Cl.[7] .......................... H04B 3/36; H04B 7/14; H04B 7/00; H04Q 7/20; H04M 1/00
(52) U.S. Cl. .......................... 455/422; 455/9; 455/456; 455/525; 455/552
(58) Field of Search ................................. 455/422, 432, 455/456, 566, 575, 186.1, 33.1, 51, 457, 3.2, 89, 418, 560, 926, 9, 525, 552, 562, 406; 340/905; 364/518

(56) References Cited

U.S. PATENT DOCUMENTS

| | | | | |
|---|---|---|---|---|
| 4,481,382 A | * | 11/1984 | Villa-Real | |
| 4,674,111 A | * | 6/1987 | Monet et al. | |
| 4,852,146 A | * | 7/1989 | Hathcock et al. | |
| 4,974,170 A | * | 11/1990 | Bouve et al. | 364/518 |
| 5,068,838 A | * | 11/1991 | Klausner et al. | 455/51 |
| 5,128,981 A | * | 7/1992 | Tsukamoto et al. | |
| 5,173,691 A | * | 12/1992 | Sumner | 340/905 |
| 5,214,622 A | * | 5/1993 | Nemoto | |
| 5,402,117 A | * | 3/1995 | Zijderhand | 340/905 |
| 5,579,535 A | * | 11/1996 | Orlen et al. | 455/33.1 |
| 5,802,469 A | * | 9/1998 | Nounin et al. | 455/422 |
| 5,870,741 A | * | 2/1999 | Kawabe et al. | 455/457 |
| 5,898,680 A | * | 4/1999 | Johnstone et al. | 455/3.2 |
| 5,915,207 A | * | 6/1999 | Dao et al. | 455/9 |
| 5,943,611 A | * | 8/1999 | Mone | 455/89 |
| 5,963,861 A | * | 10/1999 | Hanson | 455/422 |
| 5,974,311 A | * | 10/1999 | Lipsit | 455/418 |
| 6,021,333 A | * | 2/2000 | Anderson et al. | 455/560 |
| 6,029,068 A | * | 2/2000 | Takahashi et al. | 455/426 |
| 6,115,580 A | * | 9/2000 | Chuprun et al. | 455/525 |
| 6,115,611 A | * | 9/2000 | Kimoto et al. | 455/456 |
| 6,122,520 A | * | 9/2000 | Want et al. | 455/456 |
| 6,125,282 A | * | 9/2000 | Urabe | 455/552 |
| 6,125,326 A | * | 9/2000 | Ohmura et al. | 455/456 |

FOREIGN PATENT DOCUMENTS

| | | |
|---|---|---|
| EP | 0259717 | 3/1988 |
| GB | 2201865 | 9/1988 |
| JP | 5-175899 | 7/1993 |
| JP | 9-322229 | 12/1997 |
| WO | WO 93/01665 | 1/1993 |

* cited by examiner

*Primary Examiner*—William Cumming
(74) *Attorney, Agent, or Firm*—Frishauf, Holtz, Goodman, Langer & Chick, P.C.

(57) ABSTRACT

Each time a mobile terminal enters a service area of an information providing device and its location is registered by the information providing device, the area code and local code of telephone numbers and addresses associated with the service area are sent from the information providing device to the mobile terminal. Based on the area and local codes of telephone numbers and the addresses, the terminal retrieves the telephone numbers, names and addresses of acquaintances residing within the service area from an address book stored in its RAM and visually displays them with a notification sound. Thus, the user at the terminal can know access information for acquaintances residing within each service area each time the user enters the service area.

44 Claims, 3 Drawing Sheets

| AREA CODE AND LOCAL CODE | TOWN ADDRESS |
|---|---|
| 0425 79 | SAKAE-TOWN, HAMURA-CITY, TOKYO |

FIG.2

| PHONE NUMBER | NAME | ADDRESS |
|---|---|---|
| 03 3502 3100 | TARO SUZUKI | X-Y-Z, KASUMIGASEKI, CHIYODA-KU, TOKYO |
| ... | ... | ... |
| 0425 79 7654 | ICHIRO SATO | Y-Z-X, SAKAE-TOWN, HAMURA-CITY, TOKYO |
| 0425 79 2451 | YOSHIO TANAKA | Z-X-Y, SAKAE-TOWN, HAMURA-CITY, TOKYO |
| ... | ... | ... |

FIG.3

MOBILE INFORMATION DEVICE CAPABLE OF OBTAINING USER INFORMATION RELATING TO LOCAL AREA

BACKGROUND OF THE INVENTION

The present invention relates to a mobile information device capable of obtaining local color-rich user information that is closely associated with an area where it is located.

This application is based on Japanese Patent Application No. 9-103182, filed Apr. 21, 1997, the content of which is incorporated herein by reference.

In recent years, in the field of cellular communication system, a simplified mobile communication system employing weak electromagnetic waves, for example, PHS (personal handyphone system), has been put to practical use.

The PHS is such that telephone terminals (PHS terminals) are used each of which is equipped with a communication unit that provides a low power output of the order of 10 mW, a base station is placed in each of subdivided areas measuring 100 to 400 meters in diameter and covered by the weak electromagnetic waves, and the base stations are controlled by a central base station equipped with an exchange unit.

The advantages of the PHS are that the telephone terminals can easily be made small, lightweight, and inexpensive because of the use of the low-output communication unit. In addition, the PHS has an advantage of being very suitable for data communications because of its data rate as high as 9,600 bps.

The simplified mobile communication system is the most distinct from the non-simplified mobile communication system in that each service area is very small and location registration processing of notifying the PHS center (control station) of the location of each terminal through a base station is performed frequently.

There are some prior art systems utilizing this feature, as described in Japanese Patent Publications (KOKAI) H5-175, 899 and H9-322,229. According to these prior art systems, in order to inform the user of the current location of the terminal, the terminal has an address book in which addresses or addresses and area/local codes of the service areas are stored. If the terminal receives a base station ID (CS-ID) transmitted from a base station, the terminal displays the addresses or addresses and area/local codes of the corresponding service area in which the terminal is located.

These prior art units, however, merely display the location information. A mode of use of the simplified mobile communication system for making full use of its feature in which each service area is very small and location registration processing is performed frequently has not been conceived.

BRIEF SUMMARY OF THE INVENTION

Accordingly, it is an object of the present invention to provide a mobile information device which can obtain local information that is closely associated with a local area where it is located and perform a new function based on the obtained local information.

According to the present invention, there is provided a mobile information device comprising: a user memory; means for writing user information corresponding to an area into the user memory; means for receiving local information indicating an area in which the terminal locates; means for extracting user information corresponding to the area indicated by the received local information; and means for outputting the extracted user information.

According to the present invention, there is provided a computer program product for a mobile information device, the program stored in a computer readable medium and comprising the following steps of: receiving local information indicating an area in which the terminal locates; means for extracting user information corresponding to the area indicated by the received local information from the user memory for storing plural user information corresponding to areas; and outputting the extracted user information.

According to the information providing system of the present invention, the terminal is set in advance to send an information request signal at the time of responding to a location registration signal. Thus, the terminal can automatically issue a request to a base station for local information at the time of location registration to obtain the local information.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 shows the stored contents of the local information storage unit in a base station shown in FIG. 1;

FIG. 3 shows the stored contents of the address book data storage section of the RAM in the mobile terminal shown in FIG. 1.

DETAILED DESCRIPTION OF THE INVENTION

A preferred embodiment of a mobile information device according to the present invention will now be described with reference to the accompanying drawings.

Figure 1:
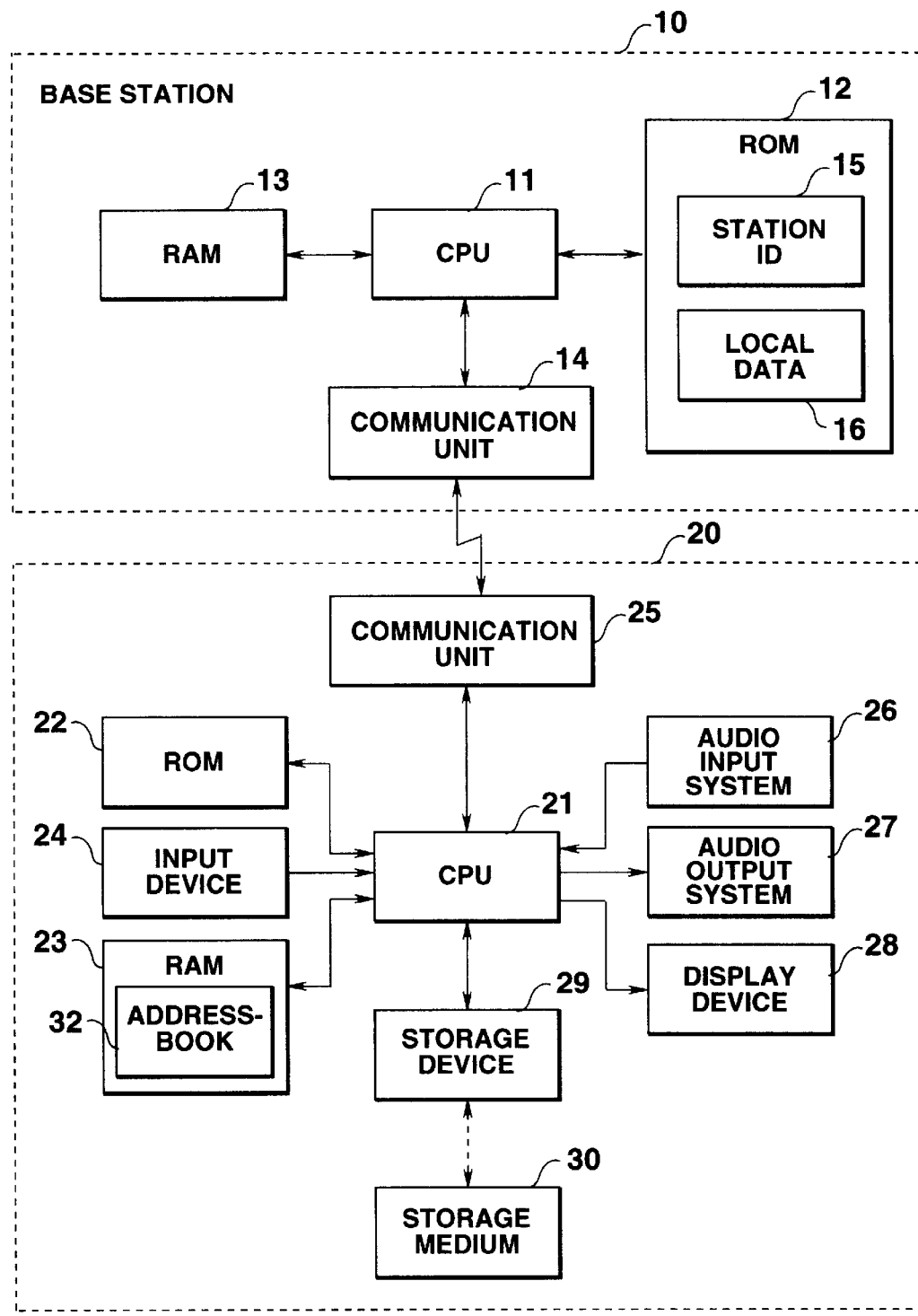
FIG. 1 is a schematic block diagram of an information providing system utilizing a mobile information device according to an embodiment of the present invention.

Referring now to FIG. 1, there is illustrated in block diagram form a schematic of the PHS system as an information providing system utilizing a mobile information device according to the embodiment of the present invention. Here, the PHS system is composed of a base station 10 and a mobile information terminal device (PHS telephone terminal) 20.

The base station 10 is located in each of subdivided service areas 100 to 400 meters in diameter and connected to a PHS center station not shown by a public line. The base station is under the control of the PHS center.

The base station 10 is equipped with a CPU 11, a ROM 12, a RAM 13, and a communication unit 14. The ROM 12 stores a base station ID 15 and local information 16. The base station ID 15 is sent from the base station 10 to the terminal device 20 at regular intervals for registration of the location of the terminal device 20 that is present in the service area associated with that base station. The local information 16 is information specific to the service area covered by the base station 10.

In this embodiment, as shown in FIG. 2, the local information 16 contains the area code and the local code of the phone number and the town address (the city or town name) of the service area. The local information 16 may contain the base station ID or an area information. Further, in a GPS (Global Positioning System), the local information 16 may further contain the position information (latitude and longitude) of the GPS. The local information 16 is sent to the terminal device 20 that has entered the service area of the base station 10 and for which location registration has been completed as requested by it.

The CPU 11, which operates in accordance with a base station control program (not shown) built into the ROM 12, controls each component of the base station 10 in response to center signals transmitted from the PHS center not shown, such as a terminal calling (ringing) signal and a talk signal, and terminal signals received from the terminal device 20 in the communication unit 14, such as a location registration responding signal and a dial/talk signal. Thus, the connection between the terminal device 20 within the service area and the PHS center is established through the base station 10. The base station 10 also sends the local information 16 to the terminal device 20 upon location registration.

The mobile information terminal device 20 is equipped with a CPU 21, a ROM 22, a RAM 23, an input device 24, a communication unit 25, an audio input system 26, an audio output system 27, a display device 28, and a storage device 29 using an external storage medium 30. In response to each of various down-link signals sent from the base station 10, such as a base station ID signal for location registration, a local information signal, a received call signal, a talk signal, etc., or various input operation signals input from the input device 24, such as a receiving operation signal, a sending operation signal, etc., the CPU 21 activates the terminal controlling program stored in advance in the ROM 22 or the terminal controlling program read in from the external storage medium 30 to control each component of the terminal device 20. Thus, the CPU 21 performs various reception and response processes on the base station 10 and makes an information display specific to the local information associated with the service area.

The communication unit 25 is equipped with a transmitter-receiver having modulation and demodulation functions and a communication ID determination function, allowing reception of down-link signals from the base station 10 and transmission of up-link signals to the base station.

The input device 24 is provided with various function keys, such as a power key, reception and sending keys, ten keys, etc. A corresponding key signal is output when a key is pressed by the user.

The ROM 22 stores a terminal controlling program for controlling the whole of the mobile information processing terminal device 20, and a telephone number and a communication ID which are specific to that terminal.

The RAM 23 contains an address book 32 (refer to FIG. 3) into which telephone numbers, names and addresses of user's acquaintances are entered through the input device 24 by the user, a work memory which temporarily stores data input to or output from the CPU 21 in accordance with communications with the base station 10, and a display memory which stores display data that is displayed on the display device 28.

FIG. 3 shows the data structure of the address book 32 in the RAM 23 of the PHS mobile terminal device 20. In the address book, a list of address book formed of the telephone numbers, names and addresses is stored as user information registered by the user. The user information may include memorandum information corresponding to the local area data registered or entered by the user. The user information may be input by the user using the input device 24 or transmitted from the network. The received information is registered.

The audio input device 26 is equipped with a microphone and an analog-to-digital converter. A voice signal is entered through this audio input device.

The audio output device 27 is provided with a digital-to-analog converter and a loudspeaker. This audio output device provides voice outputs, operation confirmation tones, and notification sounds (beeps).

Figure 4:
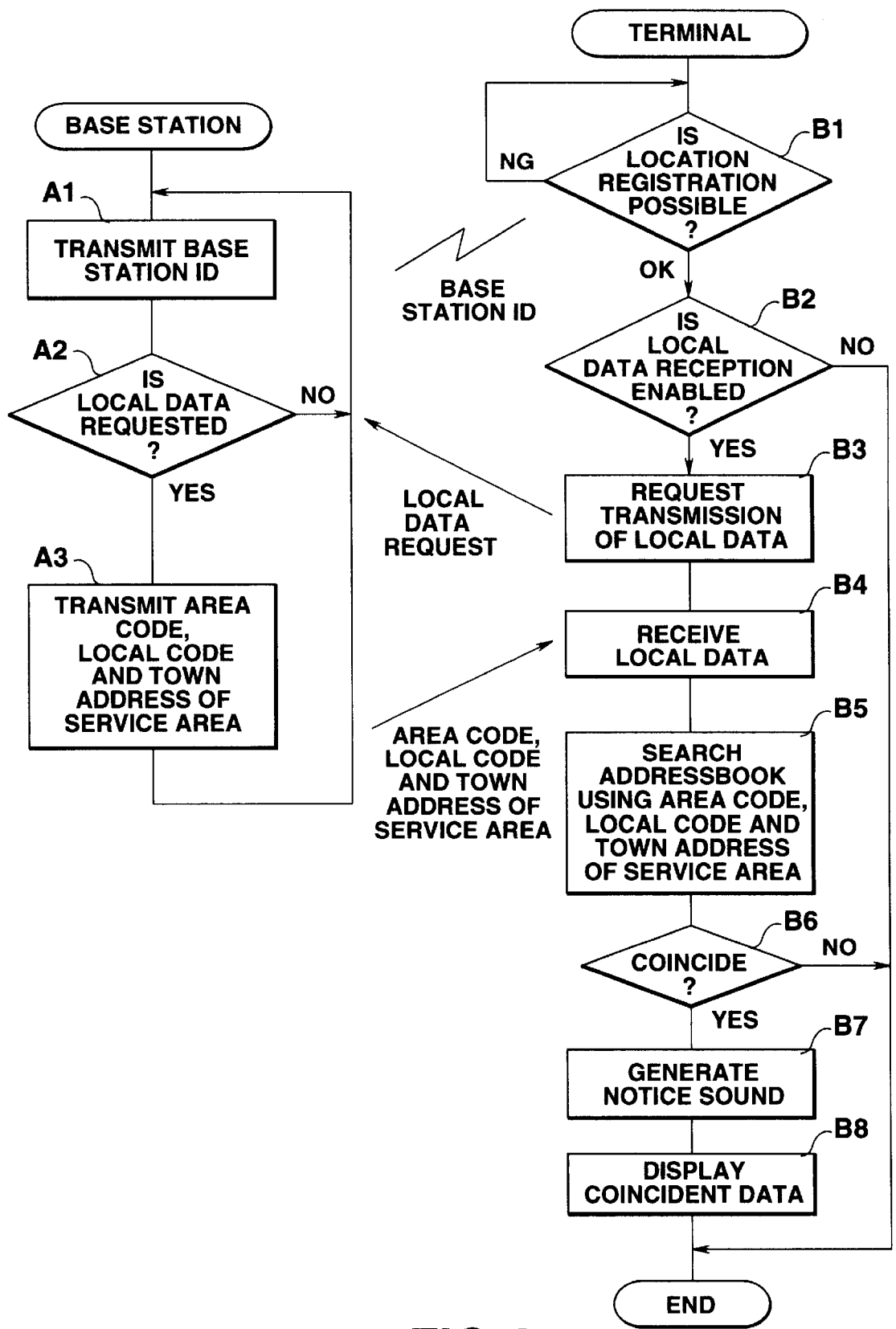
FIG. 4 is a flowchart for the operation of the embodiment for providing a list of acquaintances residing within a local area as local information.

Next, the local information providing process of the embodiment thus arranged will be described. FIG. 4 is a flowchart for this process implemented by the base station 10 and the terminal device 20. Note that the location registration is performed by the PHS center.

As described previously, the base station 10 transmits a notification signal including the base station ID via a control channel at regular intervals (step A1). With the power turned ON, the terminal device 20 is placed in the wait state for receiving the base station ID (the bas station ID may include an area ID information defined by plural service areas of plural base stations). The wait state starts when the reception of a predetermined control channel starts or the received control channel is changed to another one. In the wait state, it is determined whether location registration is possible or not (step B1).

When the base station ID is received, it is determined that the location registration is possible. The terminal device 20 starts the location registration protocol. The base station 10 executes the location registration protocol between the PHS center. The location of the terminal is registered in the PHS center. Upon completion of the location registration, it is determined by the terminal device 20 in step B2 whether the local information is requested or not. This is intended to allow the user to determine whether to request the local information or not because the local information needs a charge.

When requesting the local information, the user is required to set up the local information receiving function in advance through the operation of the input device 24 of the terminal device 20. Specifically, if a local information requesting flag is set in the RAM 23, it represents that the user desires to request the local information. If the user does not desire the local information, the information providing operation terminates.

If the local information request flag has been set, then a local information request signal is sent from the terminal device 20 to the base station 10 in step B3.

Upon receipt of the local information request signal from the mobile terminal device 20 (step A2), the base station 10 sends the local information 16 (telephone number information (area and local codes) and town address information concerning the service area as shown in FIG. 2) to the terminal device 20 that has made a request to send.

Upon receipt of the local information from the base station 10 (step B4), the terminal device 20 searches through the address book in the RAM 23 using the received local information (the area and local codes) as a search key in step B5. In step B6, it is determined whether or not some data in the address book coincides with the received local information. If there is no coincidence, then the information providing operation terminates.

If, on the other hand, there are coincidence data, a notification sound for indicating the provision of user information is generated in step B7. In step B8, a list of coincidence information concerning the acquaintance, i.e., the telephone number, name and address of the acquaintance who resides in the service area, etc., is displayed on the display device 28. Watching this display, the user will think of visiting or calling the acquaintance. If the user operates a communication key of the terminal, the displayed telephone number is automatically dialed. If, in this case, customers are registered in place of acquaintances, then the terminal user will be able to visit the customers in an efficient manner, increasing business chances.

According to this embodiment, as described above, when the user having the mobile terminal device 20 enters the service area of the base station 10 and then location registration is performed, the telephone number data (the area and local codes) and town address data (city or town) associated with the service area are sent from the base station 10 to the terminal device 20. Based on the received area and local codes and address data, the terminal 10 retrieves address book data (user information) stored in the RAM 23 which coincides with the received area and local codes and town address data, and displays them together with a notification sound. Therefore, each time the terminal user enters a service area, he or she can know, for example, access information for acquaintances who resides in that service area with no need for the user himself or herself to check the address book.

The technique described in the above embodiment, that is, the information providing process of the embodiment illustrated in the flowchart of FIG. 4 is available in the form of a computer-executable program, which, for the processing on the terminal side, can be recorded on the storage medium 30 (see FIG. 1). As the storage medium, use may be made of a memory card (ROM or RAM card), a magnetic disk (floppy or hard disk), an optical disk (CD-ROM or DVD), a magneto-optical disk, or a semiconductor memory. The storage medium 30 may be fixedly or removably mounted in the storage device 29. The CPU 21, which is a computer, reads the program recorded on the storage medium 30 through the storage device 29 and performs the functions of the terminal described in each of the embodiments, permitting the information providing process according to the above-described technique to be carried out.

In the base station 10, as in the terminal device 20, the CPU 11 reads a program from an external storage medium and performs the functions of the base station described in each embodiment.

As described above, in accordance with the mobile information device of the present invention, when the mobile information device is moved to the service area of a base station, a local information request signal is sent from the mobile information device to the base station. Thereby, local information associated with the service area which has been stored in advance in the local information memory means in the base station is sent to the mobile information device. In response to the local information, the mobile information device retrieves address data which, of addresses stored in advance in an address book storage means, corresponds to the local information and outputs them in visual form. Thus, each time the terminal user enters a different service area, he or she can know addresses that correspond to the service area.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although the present invention has been described in terms of a simplified mobile communication system using weak electromagnetic waves, such as the PHS system, the present invention is applicable to any of systems in which, each time a terminal enters a service area, the terminal location is registered in the corresponding base station. Moreover, the user information is not limited to the address book information. For example, the user information may be the addresses of government offices and public facilities, information concerning events at various facilities, local weather information, information concerning traffic jams, or the like. The contents of local information do not limit the scope of the present invention at all. Furthermore, in the case of transportation service information, it is not necessarily required for a user to designate a destination at the terminal.

What is claimed is:

1. A mobile information device connectable to an external device via a radio channel, the device comprising:
   a user memory configured to store user information which includes area information;
   a standby circuit configured to determine that the mobile information device is located in a communicatable area of the external device;
   a request circuit configured to request the external device to transmit area information indicating a location of the external device if it is determined that the mobile information device is located in the communicatable area of the external device;
   a receiver configured to receive area information from the external device after said request circuit requests transmission of the area information; and
   a circuit configured to search said user information table to extract user information which includes the area information received by said receiver.

2. The device according to claim 1, in which the user information comprises at least one of a name, address, and telephone number of acquaintances residing within the area.

3. The device according to claim 1, in which the user information comprises a transportation schedule.

4. The device according to claim 1, in which the user information comprises addresses of government offices and public facilities.

5. The device according to claim 1, in which the user information comprises information concerning events at facilities.

6. The device according to claim 1, in which the user information comprises weather information.

7. The device according to claim 1, in which the user information comprises traffic information.

8. The device according to claim 1, further comprising:
   means for indicating an access to a destination; and
   means for accessing a predetermined destination when the user information includes the predetermined destination and said indicating means indicates the access to the predetermined destination.

9. A computer program product for use with a mobile information device which is connectable to an external device via a radio channel, the computer program product being stored in a computer usable medium including computer readable program means, the computer program product comprising:

first computer readable program means for writing user information which includes area information into a memory;

second computer readable program means for determining whether the mobile information device is located in a communicatable area of the external device;

third computer readable program means for requesting that the external device transmit area information indicating a location of the external device if it is determined that the mobile information device is located in the communicatable area of the external device;

fourth computer readable program means for receiving the area information from the external device after requesting transmission of the area information; and fifth computer readable program means for searching said user information table to extract user information which includes the received area information.

10. The computer program product according to claim 9, in which the user information comprises at least one of a name, address, and telephone number of acquaintances residing within the area.

11. The computer program product according to claim 9, in which the user information comprises a transportation schedule.

12. The computer program product according to claim 9, in which the user information comprises addresses of government offices and public facilities.

13. The computer program product according to claim 9, in which the user information comprises information concerning events at facilities.

14. The computer program product according to claim 9, in which the user information comprises weather information.

15. The computer program product according to claim 9, in which the user information comprises traffic information.

16. The device according to claim 1, in which the user information comprises memorandum information which is dependent on the area.

17. The device according to claim 1, in which the area information comprises an area code and a local code of telephone numbers associated with the area.

18. The device according to claim 1, in which the area information comprises a town address.

19. The device according to claim 1, in which the area information comprises a base station ID.

20. The device according to claim 1, in which the area information comprises an area information.

21. The device according to claim 1, in which the area information received by the receiver from the external device comprises a latitude and a longitude of the area.

22. The computer program product according to claim 9, in which the user information comprises a memorandum information which is dependent on the area.

23. The computer program product according to claim 9, in which the area information comprises an area code and a local code of telephone numbers associated with the area.

24. The computer program product according to claim 9, in which the area information comprises a town address.

25. The computer program product according to claim 9, in which the area information comprises a base station ID.

26. The computer program product according to claim 9, in which the area information comprises an area information.

27. The computer program product according to claim 9, in which the area information received by the receiver from the external device comprises a latitude and a longitude of the area.

28. A method of providing information in a mobile communication system comprising a host device and a terminal device connected to the host device through a radio channel, the terminal device comprising a user information table which stores user information which includes area information, the method comprising the steps of:

determining, via the terminal device, whether the terminal device is located in a communicatable area of the host device;

requesting, via the terminal device, that the host device transmit area information indicating a location of the host device if it is determined that the terminal device is located in the communicatable area of the host device;

transmitting, from the host device to the terminal device, the area information of the host device in response to the request; and searching, via the terminal device, said user information table to extract user information which includes the received area information.

29. A mobile communication system comprising a host device and a mobile device connected to the host device via a radio channel, the host device comprising a transmitter configured to transmit to the mobile device area information indicating a location of the host device in response to a request from the mobile device, and the mobile device comprising:

a user information table configured to store user information which includes area information;

a standby circuit configured to determine that the mobile device is located in a communicatable area of the host device;

a request circuit configured to request that the host device transmit the area information of the host device if it is determined that the mobile device is located in the communicatable area of the host device;

a receiver configured to receive the area information from the host device; and a circuit configured to search said user information table to extract user information which includes the area information received by said receiver.

30. The mobile communication system according to claim 29, wherein said host device comprises a transmitter configured to transmit a device ID signal via a control channel; and said standby circuit configured to determine that the mobile device is located in a communicatable area of the host device if the device ID signal is received.

31. The method according to claim 28, in which the user information comprises at least one of a name, address, and telephone number of acquaintances residing within the area.

32. The method according to claim 28, in which the user information comprises a transportation schedule.

33. The method according to claim 28, in which the user information comprises addresses of government offices and public facilities.

34. The method according to claim 28, in which the user information comprises information concerning events at facilities.

35. The method according to claim 28, in which the user information comprises weather information.

36. The method according to claim 28, in which the user information comprises traffic information.

37. The method according to claim 28, further comprising the steps of:

indicating an access to a destination; and accessing a predetermined destination when the user information includes the predetermined destination and the access to the predetermined destination is indicated.

38. The mobile communication system according to claim 29, in which the user information comprises at least one of a name, address, and telephone number of acquaintances residing within the area.

39. The mobile communication system according to claim 29, in which the user information comprises a transportation schedule.

40. The mobile communication system according to claim 29, in which the user information comprises addresses of government offices and public facilities.

41. The mobile communication system according to claim 29, in which the user information comprises information concerning events at facilities.

42. The mobile communication system according to claim 29, in which the user information comprises weather information.

43. The mobile communication system according to claim 29, in which the user information comprises traffic information.

44. The mobile communication system according to claim 29, further comprising:

means for indicating an access to a destination; and means for accessing a predetermined destination when the user information includes the predetermined destination and said indicating means indicates the access to the predetermined destination.

* * * * *

UNITED STATES PATENT AND TRADEMARK OFFICE
CERTIFICATE OF CORRECTION

PATENT NO.     : 6,400,941 B1                                           Page 1 of 1
DATED          : June 4, 2002
INVENTOR(S)    : Kazuya Nara It is certified that error appears in the above-identified patent and that said Letters Patent is hereby corrected as shown below:

<u>Title page,</u>
Item [56], References Cited, U.S. PATENT DOCUMENTS, insert
-- 5,809,431 A * 9/1998  Bustamante et al.
   5,884,140,A * 3/1999  Ishizaki et al --;
Item [*] Notice, before "Subject to any disclaimer…" insert
-- This patent issued on a continued prosecution
   application filed under 37 CFR 1.53 (d), and
   is subject to the twenty year patent term
   provision of 35 U.S.C. 154 (a)(2) --.

Signed and Sealed this

Twenty-first Day of October, 2003

JAMES E. ROGAN
*Director of the United States Patent and Trademark Office*